INVENTOR
ROBERT SAUL
BY *[signature]*
ATTORNEY

United States Patent Office 3,464,010
Patented Aug. 26, 1969

3,464,010
POWER METER FOR ATHERMAPEUTIC APPARATUS
Robert Saul, Long Island City, N.Y., assignor to Diapulse Corporation of America, New York, N.Y., a corporation of Delaware
Filed Oct. 25, 1966, Ser. No. 589,402
Int. Cl. G01r 23/04, 25/02, 27/02
U.S. Cl. 324—95        4 Claims

ABSTRACT OF THE DISCLOSURE

An accurate meter for indicating the high frequency power emanating from the treatment head of an athermapeutic apparatus is provided. The high frequency radiations transmitted by the treatment head are variable depending upon the selected setting of the athermapeutic apparatus. In order to accurately indicate the precise power of such radiations the meter is provided with a pick-up loop of preselected size and configuration which is positioned in definite relationship to the treatment head. When thus in proper place the meter-loop is accordingly located very accurately relative to maximum output field of the emitted high frequency radiations resulting in the meter scale thus accurately indicating the exact power output of high frequency radiations at all operative settings of the thermapeutic apparatus. The pick-up loop also functions as a support for the meter casing when in position upon the treatment head.

---

The present invention relates to a high frequency power indicating meter particularly for measuring the power output from an athermapeutic apparatus which produces electromagnetic radiations of preselected high frequency for transmission into the body of a patient in juxtaposition to such apparatus.

Athermapeutic apparatus for the treatment of the animal body has been long known to the art with a current type of such apparatus being shown and described in U.S. Patent No. 3,043,310, issued May 22, 1962, to Arthur S. Milinowski, and assigned to the same assignee as the present invention. As specifically pointed out in such prior patent the pulse duration and frequency of the generated radiations is adjustable at the will of the operator by control knobs on the apparatus so that pulse frequencies and penetration of the generated high frequency radiations can be selected depending upon the part of the body being subjected to pulsed high frequency radiations emanating from the treatment head of the athermapeutic apparatus.

Although such apparatus is provided with a meter on the face of the control panel for the purpose of indicating the total power output in watts at each setting of the control knobs, such meter is actually disposed remote from the treatment head. Consequently, the meter is necessarily connected to the high frequency generating circuit as to give only a relative recordation of the actual power generated by the apparatus and definitely transmitted by the treatment head itself.

It is accordingly the primary object of the present invention to provide a high frequency power indicating meter for use with high frequency elemtromagnetic athermapeutic apparatus which gives an accurate indication of the actual power output emanating from the treatment head of an athermapeutic apparatus.

Another object of the present invention is to provide a direct reading power indicating meter readily positionable on the treatment head of an athermapeutic apparatus and which invariably gives an accurate indication of the actual radiation power output from such apparatus at all pulse frequency and penetration settings of the apparatus.

Another object of the present invention is the provision of a high frequency power indicating meter which functions as a test set for checking the complete operation and overall performance of a high frequency electromagnetic athermapeutic apparatus.

The foregoing objects, together with others which will become readily apparent to those skilled in the art as the following description proceeds, are achieved in accordance with the present invention by the provision of a direct reading power indicating meter which measures maximum absolute output power in watts with load equivalent to the human body. Such meter is provided with a unique detector circuit so that the meter serves as a test set to check the complete operation and overall performance of the athermapeutic apparatus. In addition such meter is provided with a top scale for directly measuring in watts the precise power output emanating from the treatment head at each setting of the penetration control knob of the athermapeutic apparatus. A second scale is also provided on the meter which directly measures average output power in watts at each setting of the pulse frequency control knob of the athermapeutic apparatus for the purpose of indicating whether the output power is within specification limits. The face of the meter is also provided with a bottom scale for indicating power output of the athermapeutic apparatus when the penetration control is set specifically at 4 and the pulse frequency at 400 which is the common control settings for treatment of the liver of a patient.

The present invention may be more fully appreciated by reference to the accompanying drawing wherein.

Figure 1:
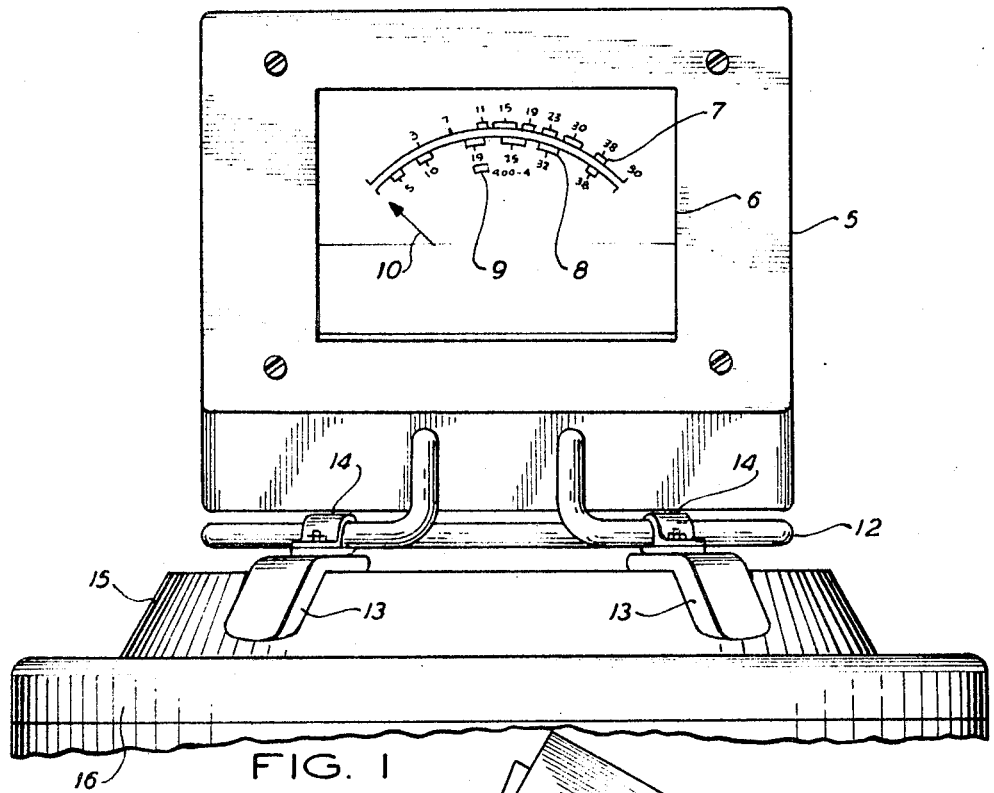
FIGURE 1 is a front elevational view of high frequency power indicating meter of the present invention.
Figure 2:
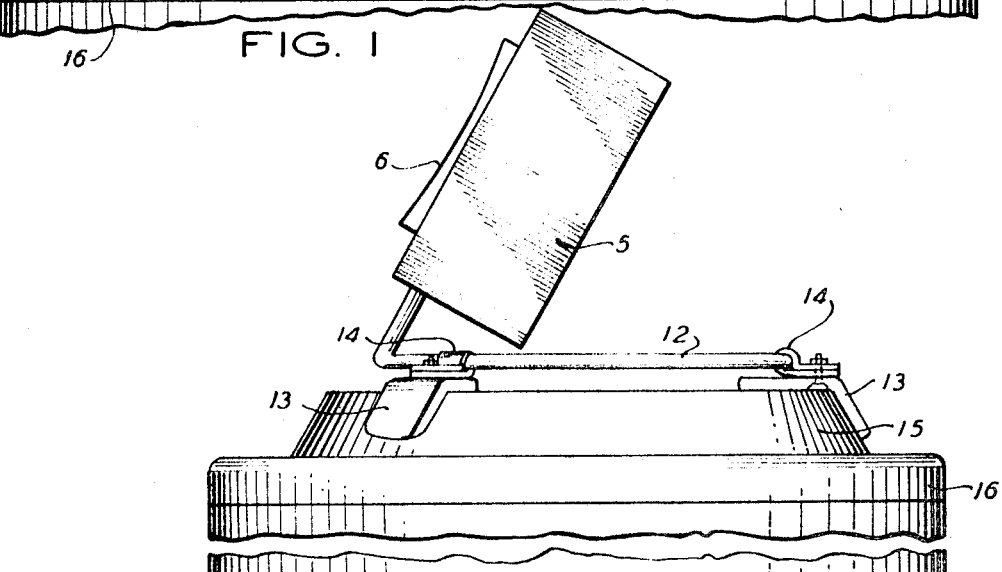
FIG. 2 is an elevational view looking at the right side of the meter shown in FIG. 1.

Referring now to the drawings in detail the meter of the present invention and as shown more particularly in FIGS. 1 and 2 comprises a casing 5 having a transparent face 6 and beneath which are an upper arcuate scale 7, a middle arcuate scale 8, and a lower arcuately disposed scale 9. A needle or pointer 10 sweeps across these scales in the usual manner when power is supplied to the meter in the manner hereinafter described. The casing 5 is angularly supported by a metallic coil 12 preferably formed of copper tubing and constituting a pick-up loop for the meter circuit. As seen from FIGS. 1 and 2 such metallic coil or loop 12 is provided with a plurality of peripherially disposed feet 13 of plastic or the like secured thereto by nylon or similar clamps 14 to enable the meter 5 to rest on the raised circular face 15 of the treatment head 16.

When the meter of the present invention is in the position as shown in FIGS. 1 and 2 and thus resting on the treatment head face plate 15, the electromagnetic radiations emanating from such head 16 creates an electromagnetic field which passes through the pick-up loop 12. Accordingly, in order for this pick-up loop to receive the maximum field intensity its dimensions are quite material. For example, the outside diameter of the ¼ inch copper tubing coil 12 should approximate 6¼ inches plus or minus a few percent and the spacing thereof from the surface of the head face plate 15 should approximate 7/32 inch likewise within a few plus or minus percent, as otherwise such coil 12 would be disposed outside the maximum intensity of the magnetic field and hence the meter 5 would not give an accurate reading. The angulation between the pick-up coil 12 and the meter casing 5 is not particularly important so far as operation is concerned and hence such angle is determined solely for purposes of convenience in reading.

Figure 3:
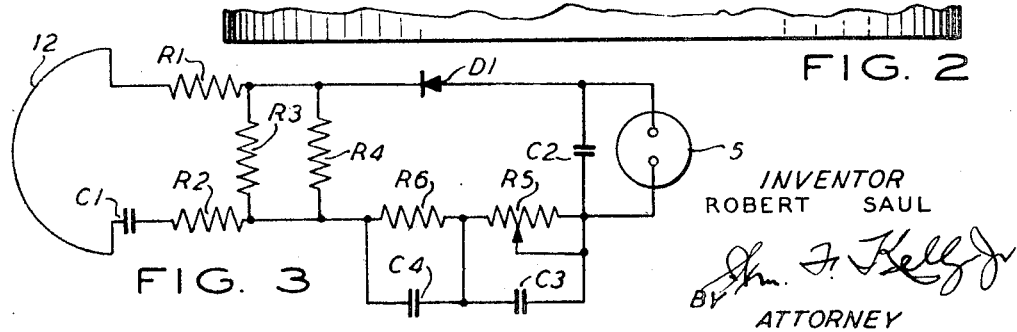
FIG. 3 is a schematic illustration of the electrical components of the indicating meter of the present invention.

In order for the meter of the present invention to accurately measure the average power output emanating from the treatment head 16, the meter is provided internally with a "dummy" non-inductive load, as shown in FIG. 3 by the resistors R1 and R2, which together with the pick-up coil 12 and a capacitor C1 form a resonant circuit at a frequency of 27 magacycles. The voltage developed across this dummy load R1 and R2 during operation of the athermapeutic apparatus is accordingly proportional to the power radiated by the head 16 within the area enclosed by the pick-up loop 12, which because of its dimensions as above mentioned is essentially the total power output at any given setting of the apparatus. The value of the resistors R1 and R2 are so chosen that they approximate a total of 73 ohms at 27 megacycles and the load thereof is hence equivalent to that of the human body in average watts within an accuracy of ±5%.

From FIG. 3 it will be noted that a portion of the R-F current flow is takn off the dummy load circuit at voltage pick-off points constituting dummy load pick-off resistors R3 and R4, which current is then rectified by a diode tube or the like D1, and fed into a taut-band type DC microammeter comprising the meter 5 with its special calibrated face scales 7, 8 and 9, as previously mentioned, and which meter 5 is shunted by a bypass capacitor C2. This pick-off meter circuit also includes a calibration potentiometer R5 shunted by an RF bypass capacitor C3, and a resistor R6 for limiting the potentiometer current which latter is likewise shunted by a RF bypass capacitor C4.

The top scale 7 of the meter 5 accordingly measures output power in watts, at each setting of the "PENETRATION" control knob of the athermapeutic apparatus which adjusts output power, and such scale 7 thus indicates whether the output power is within specification limits. When correctly within such limits the meter pointer 10 registers within the black areas 11, 15, 19, 23, 30 and 38 of the scale 7 at "PENETRATION" settings of 1 to 6, respectively. In a similar manner the second scale 8 measures average output power in watts at each setting of the "PULSE FREQUENCY" control knob of the apparatus. The correct operation of the latter is thus indicated by the scale pointer 10 aligning within the scale 8 black areas 5, 10, 19, 25, 32 and 38 at "PULSE FREQUENCY" settings of 80, 160, 300, 400, 500 and 600, respectively. Lower scale 9 has a single black area designated 400-4 with which the pointer 10 correctly registers when the "PENETRATION" control knob is set at 4 and the "PULSE FREQUENCY" knob is set at 400 which is the proper common setting for power output of the athermapeutic apparatus when treating the liver of a patient.

It should accordingly be obvious to those skilled in the art from the foreging that a high frequency power indicating meter has been provided by the present invention particularly for indicating the power output of an athermapeutic apparatus. Moreover, such meter comprises an R-F input circuit, having a loop of preselected shape and dimensions to produce a definite inductance, as well as such circuit being provided with preselected capacitance value and load, so that the R-F circuit presents the same impedance as that of the human body. Also, such meter is provided with a detector circuit designed to accurately measure the average value of the R-F signal over a wide range of pulse rates and operates as a linear detector over a large range of power emanating from the athermapeutic apparatus. In addition the meter of the present invention with its unique detector circuit serves as a test set to directly check the complete operation and overall performance of such athermapeutic apparatus, since the top meter scale indicates overall performance of the R-F stages, the second scale directly checks performance of the rate generator and modulator of the apparatus, and the bottom scale constitutes a confidence setting for critical medical treatment application of the apparatus.

I claim:

1. A power meter particularly for indicating the high frequency power output emanating from the treatment head of an athermapeutic apparatus at each one of several power output settings of such apparatus comprising:
    (a) a casing provided with a meter face having a plurality of indicating scales and a meter pointer movable into registration with said indicating scales,
    (b) a metallic coil of preselected size and configuration, conductive means extending from the coil to support the casing and provide electrical coupling between the coil and the interior of the casing for supplying R-F power interiorly of said meter casing when said metallic coil is positioned a predetermined distance contiguous to the treatment head of said athermapeutic apparatus and hence in a preselected position within the electromagnetic field emanating therefrom,
    (c) electrical elements within said casing to which said metallic coil is connected to complete an R-F input circuit for said meter having the same impedance as the human body, and
    (d) a detector circuit within said casing and connected to the R-F input circuit of said meter to cause said meter pointer to move over said scales and accurately indicate the average value of R-F power emanating from said treatment head over a wide range of pulse rates on one scale, and to cause said pointer to indicate the power output at each one of a large range of several power values on another of said scales.

2. A power meter particularly for indicating the high frequency power output emanating from the treatment head of an athermapeutic apparatus as set forth in claim 1 wherein:
    said metallic coil of preselected size and configuration and connected to said casing is also provided with a plurality of non-conducting feet peripherally disposed thereabout for supporting said metallic coil a predetermined distance from the face of said treatment head of the athermapeutic apparatus and hence within the area of maximum intensity of the magnetic field emanating from the contiguous treatment head.

3. A power meter particularly for indicating the high frequency power output emanating from the treatment head of an athermapeutic apparatus as set forth in claim 1 wherein:
    said meter pointer is movable over a first scale on said meter face having indicia representative of average power value received by said metallic coil from the contiguous treatment head of said athermapeutic apparatus at all power output values emanating therefrom, a second scale on the face of said meter having indicia within which said meter pointer is registerable to indicate total power output over a wide range of pulse frequency values emanating from said treatment head, and a third scale on the face of said meter with which said meter pointer is registerable to indicate when a definite preselected power output emanates from said contiguous treatment head.

4. A power meter particularly for indicating the high frequency power output emanating from the treatment head of an athermapeutic apparatus as set forth in claim 1 wherein:
    said electrical elements within said casing together with said metallic coil connected thereto and forming an R-F input circuit for said meter have a total resistance of approximately 73 ohms at a frequency of 27 megacycles to thus simulate the same impedance as the human body.

References Cited

UNITED STATES PATENTS

| | | | |
|---|---|---|---|
| 932,819 | 8/1909 | Shoemaker | 325—67 XR |
| 1,152,632 | 9/1915 | Hogan | 324—119 XR |
| 2,546,093 | 3/1951 | Gilbert | 324—119 |
| 2,565,900 | 8/1951 | Wiley | 324—95 XR |
| 2,648,048 | 8/1953 | Vackar | 324—119 |
| 2,852,668 | 9/1958 | Trainer | 324—95 XR |

OTHER REFERENCES

Oberto, G. P., "Field-Strength Meter"; Electronics World, December 1962, p. 79 (copy in 325–67).

RUDOLPH V. ROLINEC, Primary Examiner
E. F. KARLSEN, Assistant Examiner

U.S. Cl. X.R.

325—363